United States Patent
Yamakawa

(10) Patent No.: US 9,618,885 B2
(45) Date of Patent: Apr. 11, 2017

(54) FIXING DEVICE AND IMAGE FORMING APPARATUS INCLUDING THE SAME

(71) Applicant: KYOCERA Document Solutions Inc., Osaka-shi, Osaka (JP)

(72) Inventor: Tomohiko Yamakawa, Osaka (JP)

(73) Assignee: KYOCERA Document Solutions Inc. (JP)

( * ) Notice: Subject to any disclaimer, the term of this patent is extended or adjusted under 35 U.S.C. 154(b) by 64 days.

(21) Appl. No.: 14/767,324

(22) PCT Filed: Jan. 26, 2015

(86) PCT No.: PCT/JP2015/052043
§ 371 (c)(1),
(2) Date: Aug. 12, 2015

(87) PCT Pub. No.: WO2015/146268
PCT Pub. Date: Oct. 1, 2015

(65) Prior Publication Data
US 2017/0003631 A1 Jan. 5, 2017

(30) Foreign Application Priority Data

Mar. 28, 2014 (JP) .................................. 2014-067643

(51) Int. Cl.
*G03G 15/20* (2006.01)
*F16C 23/00* (2006.01)
(Continued)

(52) U.S. Cl.
CPC ......... *G03G 15/2053* (2013.01); *F16C 23/06* (2013.01); *F16C 23/08* (2013.01);
(Continued)

(58) Field of Classification Search
CPC ... G03G 15/2053; F16C 13/022; F16C 19/06; F16C 23/06; F16C 25/083;
(Continued)

(56) References Cited

U.S. PATENT DOCUMENTS 1,829,189 A * 10/1931 Schroeder ............. B41F 31/304
  384/469
1,993,519 A * 3/1935 Miltenberger ......... B65G 13/11
  193/35 R
(Continued)

FOREIGN PATENT DOCUMENTS

DE  2715416 A1 * 10/1978 ............ F16C 33/723
JP  56070120 A *  6/1981
(Continued)

OTHER PUBLICATIONS

International Search Report.
Written Opinion.

*Primary Examiner* — Robert Beatty
(74) *Attorney, Agent, or Firm* — Gerald E. Hespos; Michael J. Porco; Matthew T. Hespos

(57) ABSTRACT

A fixing device includes a housing, a cylindrical rotary member, a shaft, a heat source, a bearing and a ring member. The bearing includes an inner race supporting the shaft, and an outer race supporting an inner circumferential portion of the rotary member and being rotatable relatively to the inner race. The ring member is fit on the shaft adjacent to the bearing. The ring member includes an outer circumferential surface that contacts with the inner circumferential portion of the rotary member from radially inside, and a side surface that contacts the inner race and the outer race of the bearing in an axial direction.

20 Claims, 11 Drawing Sheets

(51) Int. Cl.
    *F16C 25/00* (2006.01)
    *F16C 25/08* (2006.01)
    *F16C 23/06* (2006.01)
    *F16C 25/06* (2006.01)
    *F16C 23/08* (2006.01)

(52) U.S. Cl.
    CPC ............ *F16C 25/06* (2013.01); *F16C 25/083* (2013.01); *G03G 15/2017* (2013.01)

(58) Field of Classification Search
    CPC ........ F16C 33/605; F16C 35/07; F16C 25/06; F16C 23/08
    USPC .................. 399/330, 331; 384/520, 551, 586
    See application file for complete search history.

(56) References Cited

U.S. PATENT DOCUMENTS

| | | | | |
|---|---|---|---|---|
| 4,267,920 A | * | 5/1981 | Olschewski | B65G 39/09 193/37 |
| 5,805,958 A | * | 9/1998 | Fisk | F16C 33/7886 384/130 |
| 5,833,374 A | * | 11/1998 | Casaro | F16C 19/54 384/537 |
| 8,505,706 B2 | * | 8/2013 | Horling | B65G 39/09 193/37 |
| 2013/0004219 A1 | * | 1/2013 | Takahashi | G03G 15/206 399/329 |
| 2014/0014379 A1 | * | 1/2014 | Dufty | A01B 29/02 172/518 |
| 2014/0064802 A1 | | 3/2014 | Uchida | |

FOREIGN PATENT DOCUMENTS

| | | | |
|---|---|---|---|
| JP | 57-94769 | | 6/1982 |
| JP | 58-40766 | | 3/1983 |
| JP | 10073124 A | * | 3/1998 |
| JP | 2001-66932 | | 3/2001 |
| JP | 2004-77678 | | 3/2004 |
| JP | 2009-162975 | | 7/2009 |
| JP | 2010-217587 | | 9/2010 |
| JP | 2014-47847 | | 3/2014 |

* cited by examiner

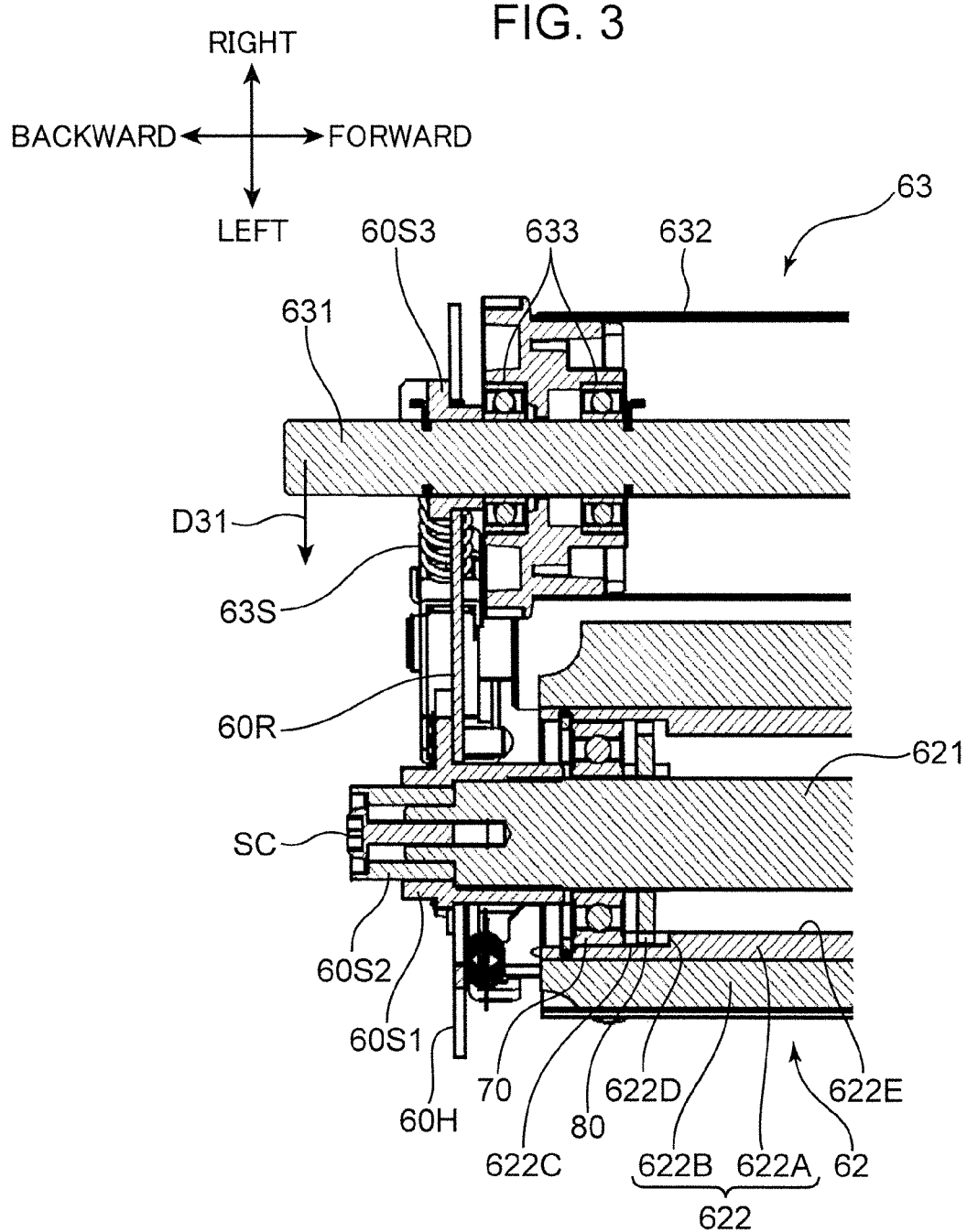

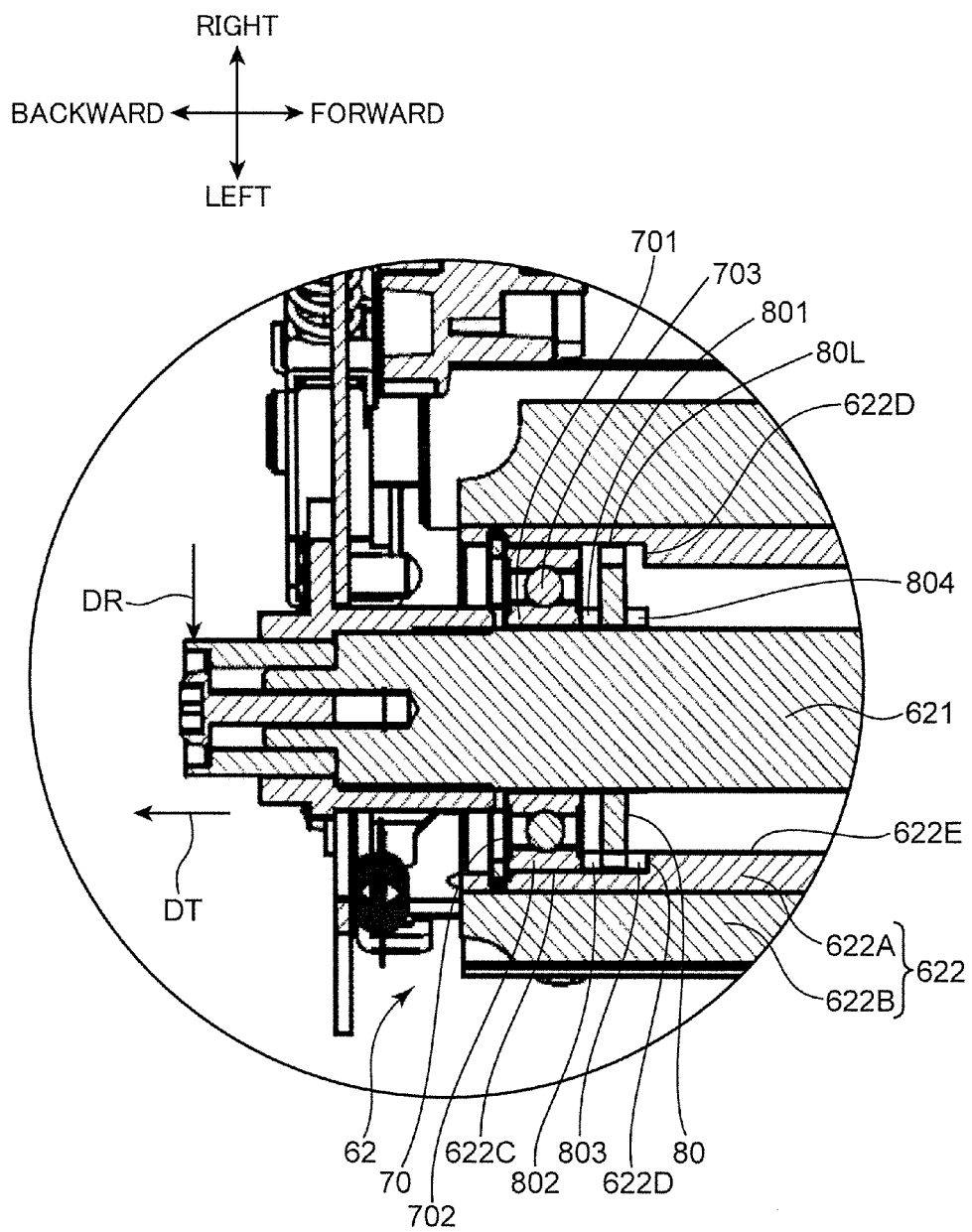

FIXING DEVICE AND IMAGE FORMING APPARATUS INCLUDING THE SAME

TECHNICAL FIELD

The present invention relates to a fixing device and an image forming apparatus including the same.

BACKGROUND ART

Conventional fixing devices for performing a fixing treatment for a sheet include a pair of rotary members each rotatable around a rotation shaft. A sheet passes through a nip defined between the pair of rotary members, whereby a developer image on the sheet is fixed. In such a fixing device, the rotary member is rotatably and axially supported by a specific bearing.

Japanese Unexamined Patent Publication No. 2004-77678 discloses a technique of placing a conical spring washer in respective spaces between the opposite end surfaces of a rotary member and corresponding bearings in order to fix the bearings and a driving gear at respective predetermined retaining positions. Each of the conical spring washers exerts a biasing force to thereby prevent the bearing and the driving gear from axially shifting with respect to each other.

SUMMARY OF INVENTION

In the technique disclosed in Japanese Unexamined Patent Publication No. 2004-77678, different axial loads act on an inner race and an outer race of the bearing. Therefore, the bearing is liable to break, which is a problem.

The present invention aims to provide a fixing device capable of preventing breakage of a bearing rotatably and axially supporting a rotary member, and an image forming apparatus including the fixing device.

A fixing device according to an aspect of the present invention comprises: a housing; a rotary member in the form of a cylinder including an outer circumferential portion, and an inner circumferential portion made of a metal; a shaft secured to the housing and having an axis of rotation of the rotary member; a heat source configured to generate heat to be transmitted to the rotary member; a bearing including an inner race supporting the shaft, and an outer race radially spaced from the inner race and supporting the inner circumferential portion of the rotary member, the outer race being rotatable relatively to the inner race; and a ring member fitted on the shaft adjacently to the bearing, and including a circumferential surface having come into contact with the inner circumferential portion of the rotary member from radially inside, and a side surface having come into contact with the inner race and the outer race of the bearing in an axial direction.

An image forming apparatus according to another aspect of the present invention comprises: an image forming section configured to form a developer image on a sheet; and the above-described fixing device configured to fix the developer image on the sheet.

The present invention provides a fixing device capable of preventing breakage of a bearing rotatably and axially supporting a rotary member, and an image forming apparatus including the fixing device.

BRIEF DESCRIPTION OF DRAWINGS

FIG. 3 is a partial enlarged sectional view of the fixing device according to the embodiment of the present invention.

FIG. 4 is a partial enlarged sectional view of the portion of the fixing device shown in FIG. 3.

DESCRIPTION OF EMBODIMENTS

Figure 1:
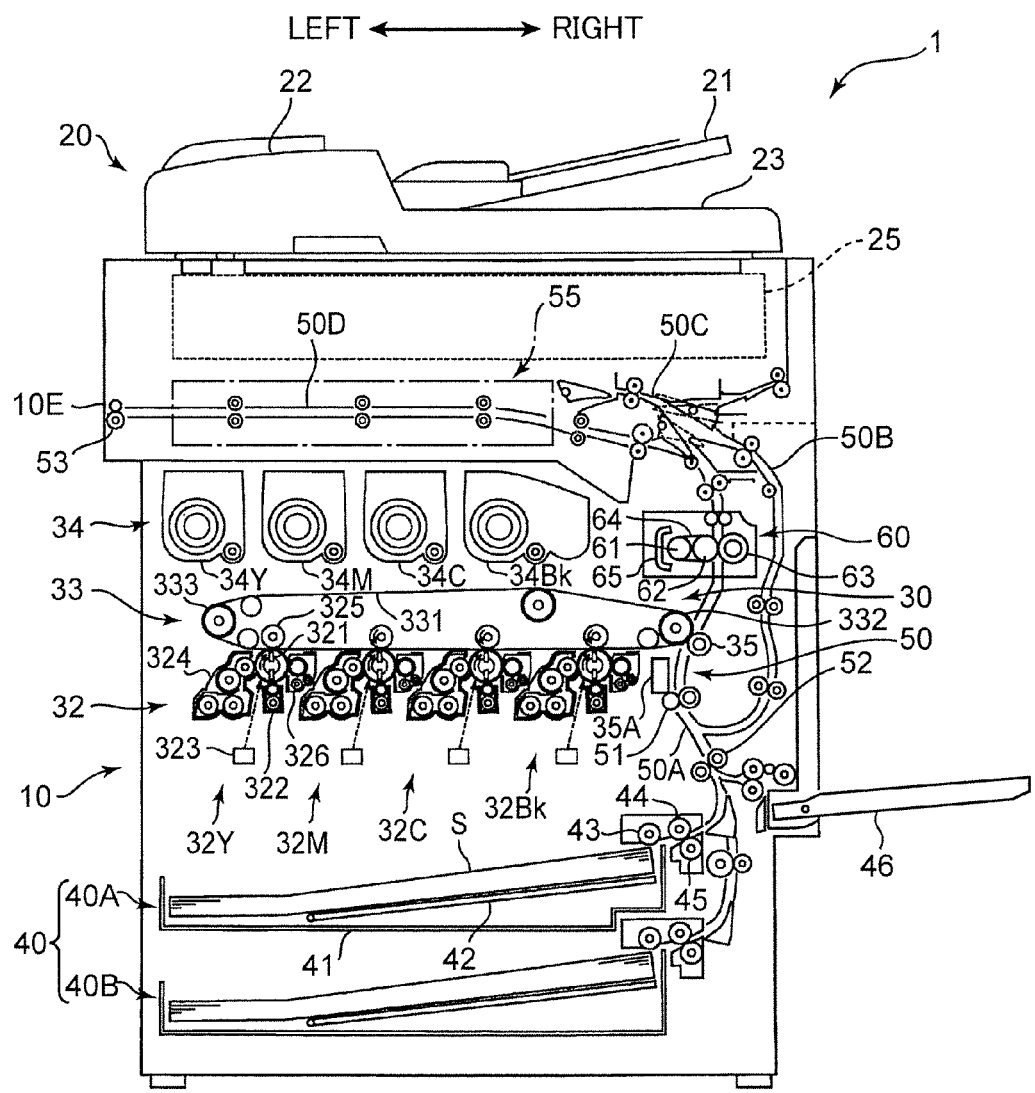
FIG. 1 is a sectional view showing an internal structure of an image forming apparatus according to an embodiment of the present invention.
Figure 2:
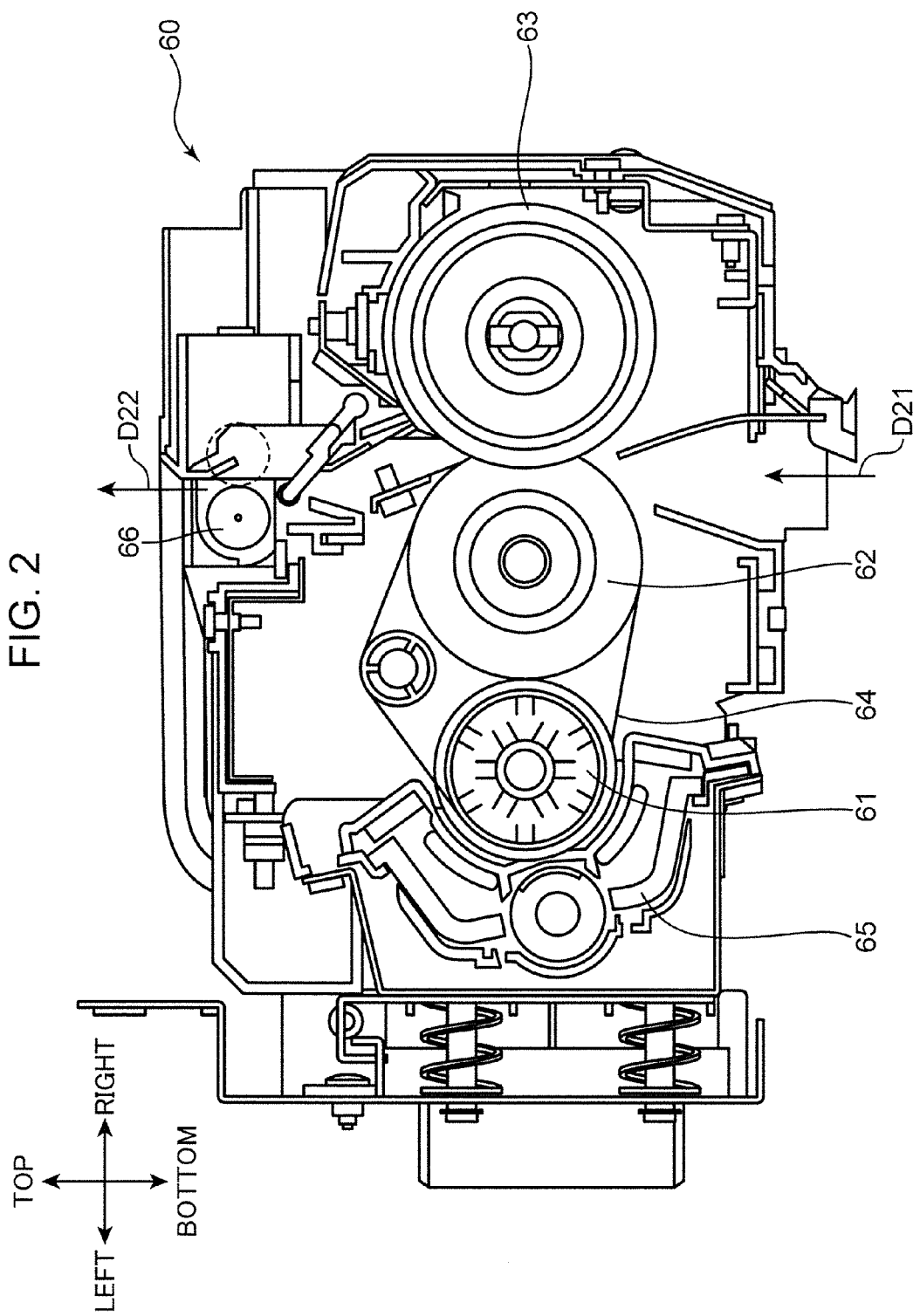
FIG. 2 is a sectional view of a fixing device according to the embodiment of the present invention.

Hereinafter, an embodiment of the present invention will be described in detail with reference to the accompanying drawings. FIG. 1 is a sectional view showing an internal structure of an image forming apparatus 1 according to an embodiment of the present invention. Here, the image forming apparatus 1 is illustrated as a multifunctional apparatus having a printing function and a copy function. However, a printer, a copier, or a facsimile apparatus may alternatively be provided as an image forming apparatus. FIG. 2 is a sectional view of a fixing section 60 according to the embodiment of the present invention.

<Description of Image Forming Apparatus>

The image forming apparatus 1 includes an apparatus main body 10 having a housing structure generally in the form of a cuboid, and an automatic document feeder 20 disposed on the apparatus main body 10. The apparatus main body 10 includes therein a reading section 25 for optically reading an original image to be copied, an image forming section 30 for forming a toner image on a sheet, the fixing section 60 (fixing device) for fixing the toner image on the sheet, a sheet feeding section 40 for storing a sheet to be conveyed to the image forming section 30, and a conveyance passage 50 for allowing a sheet to be conveyed therethrough from the sheet feeding section 40 or a sheet feeding tray 46 to a sheet discharge port 10E via the image forming section 30 and the fixing section 60.

The automatic document feeder (ADF) 20 is rotatably mounted on the top surface of the apparatus main body 10. The ADF 20 automatically feeds an original sheet to be copied to a predetermined automatic document reading position in the apparatus main body 10. On the other hand, in the case where a user manually places an original sheet on a predetermined document reading position, the ADF 20 is opened upward. The ADF 20 includes a document tray 21 for allowing an original sheet to be placed thereon, a document conveyor 22 for conveying the original sheet through the automatic document reading position, and a document receiving tray 23 for receiving the original sheet discharged after being read.

The reading unit 25 optically reads an image on an original sheet automatically fed by the ADF 20 disposed on the top surface of the apparatus main body 10 and an image on a manually placed original sheet.

The image forming section 30 generates a full-color toner image and transfers it onto a sheet. The image forming section 30 includes image forming units 32 consisting of four units 32Y, 32M, 32C, and 32Bk for forming toner images in yellow (M), magenta (M), cyan (C) and black (Bk), respectively, and disposed in tandem with one another, an intermediate transfer unit 33 disposed adjacent to and above the image forming units 32, and toner suppliers 34 disposed above the intermediate transfer unit 33.

Each of the image forming units 32Y, 32M, 32C, and 32Bk includes a photoconductive drum 321, and a charger 322, an exposure device 323, a developing device 324, a primary transfer roller 325, and a cleaning device 326 disposed around the photoconductive drum 321.

The photoconductive drum 321 rotates around its axis, and has a circumferential surface on which an electrostatic latent image and a toner image are formed. The charger 322 charges the surface of the photoconductive drum 321 uniformly. The exposure device 323 includes a laser light source and an optical device such as mirror and lens and irradiates the circumferential surface of the photoconductive drum 321 with beams of light to form an electrostatic latent image, the beams of light being in accordance with image data of an image on an original sheet.

The developing device 324 supplies toner to the circumferential surface of the photoconductive drum 321 to develop an electrostatic latent image formed on the photoconductive drum 321. The primary transfer roller 325 defines a nip with the photoconductive drum 321 while sandwiching an intermediate transfer belt 331 included in the intermediate transfer unit 33 therebetween, and primarily transfers a toner image formed on the photoconductive drum 321 onto the intermediate transfer belt 331. The cleaning device 326 includes a cleaning roller and the like, and cleans the circumferential surface of the photoconductive drum 321 after a toner image is transferred therefrom.

The intermediate transfer unit 33 includes the intermediate transfer belt 331, a belt driving roller 332, and a driven roller 333. The intermediate transfer belt 331 is configured by an endless belt wound around the belt driving roller 332 and the driven roller 333. A plurality of toner images are transferred from the plurality of photoconductive drums 321 to the same area of the outer surface of the intermediate transfer belt 331 in a superimposed manner. The intermediate transfer unit 33 runs counterclockwise in FIG. 1.

A secondary transfer roller 35 is disposed opposite the circumferential surface of the belt driving roller 332. The belt driving roller 332 and the secondary transfer roller 35 define a nip serving as a secondary transfer section where a full-color toner image consisting of superimposed toner images on the intermediate transfer belt 331 is transferred to a sheet. One of the belt driving roller 332 and the second transfer roller 35 is applied with a secondary transfer bias potential having a polarity opposite to that of the toner image, and the other of the rollers is grounded. Further, a density sensor 35A is disposed opposite the outer surface of the intermediate transfer belt 331 at the upstream side of the belt driving roller 332 in the rotational direction of the intermediate transfer belt 331. The density sensor 35A outputs an electrical signal corresponding to the density of an image formed on the intermediate transfer belt 331.

The toner suppliers 34 include a yellow toner container 34Y, a magenta toner container 34M, a cyan toner container 34C, and a black toner container 34Bk. Each of the toner containers 34Y, 34C, 34M, and 34Bk contains toner of the respective color and supplies it to the developing device 324 of the corresponding one of the image forming units 32Y, 32M, 32C, and 32Bk through an unillustrated supply path.

The sheet feeding section 40 includes two sheet feeding cassettes 40A and 40B disposed one above the other, each of which stores sheets S to be subjected to image formation. These cassettes 40A and 40B can be pulled out forward from the front of the apparatus main body 10.

The sheet feeding cassette 40A (40B) includes a sheet storage portion 41 for storing a stack of sheets S, and a lift plate 42 for lifting the stack of sheets for feeding. A pickup roller 43, and a pair of a sheet feeding roller 44 and a retard roller 45 are disposed above the right end of the sheet feeding cassette 40A (40B). By driving of the pickup roller 44 and the sheet feeding roller 44, sheets S are picked up one by one from the top of the stack of sheets S stored in the sheet feeding cassette 40A and conveyed into the upstream end of the conveyance passage 50.

The conveyance passage 50 includes a main conveyance passage 50A used for conveying a sheet S from the sheet feeding section 40 to the outlet of the fixing section 60 through the image forming section 30, a reverse conveyance passage 50B used for returning a sheet having one side printed to the image forming section 30 in the case where the sheet S is subjected to double-sided printing, a lower conveyance passage 50D used for advancing a sheet S to the sheet discharge port 10E from the downstream end of the main conveyance passage 50A, and an upper conveyance passage 50C used for bringing a sheet S into the reverse conveyance passage 50B in the manner of switchback. The lower conveyance unit 50D is disposed in an intermediate conveyance unit 55 attachable to and detachable from the apparatus main body 10.

A pair of registration rollers 51 are disposed upstream of the secondary transfer section in the main conveyance passage 50A. A sheet S is temporarily stopped by the pair of registration rollers 51 in a suspended state, thereby being subjected to skew correction. Thereafter, the pair of registration rollers 51 are driven to rotate by a driving motor (not shown) to thereby deliver the sheet S to the secondary transfer roller 35 at a predetermined timing for image transfer. In addition, a plurality of sheet conveyance rollers 52 for conveying a sheet S are disposed in the main conveyance passage 50A as well as in the other conveyance passages 50B, 50C and 50D. A discharge roller 53 is disposed near the sheet discharge port 10E. A sheet S is discharged to an unillustrated sheet receiving tray or a post-processing device.

The fixing section 60 (fixing device) is configured by an induction heating type fixing device for fixing a toner image on a sheet S, and includes a heating roller 61, a fixing roller 62, a pressing roller 63, a fixing belt 64, and an induction heating unit 65 (heat source). The pressing roller 63 is brought into pressed contact with the fixing roller 62 with the fixing belt 64 being sandwiched therebetween, to define a fixing nip therebetween. The pressing roller 63 is driven to rotate by an unillustrated driver. On the other hand, the fixing roller 62 is driven to rotate by rotation of the pressing roller 63. The fixing belt 64 is wound around the fixing roller 62 and the heating roller 61. The fixing belt 64 is inductively heated on the circumferential surface of the heating roller 61 by the induction heating unit 65 to transmit the heat to the fixing nip. At this time, the heat generated by the induction heating unit 65 is also transmitted to the fixing roller 62 via the fixing belt 64. Passage of a sheet S through the fixing nip allows a toner image transferred on the sheet S to be fixed.

With reference to FIG. 2, in the present embodiment, a sheet is conveyed upward into the fixing section 60 from below (as shown by the arrow D21 in FIG. 2). At this time, a side of the sheet formed with a toner image comes into contact with a portion of the fixing belt 64 that extends on the fixing roller 62. Further, the other side of the sheet opposite to the side formed with the toner image comes into contact with the pressing roller 63. The sheet is subjected to the fixing treatment in the fixing nip and then conveyed upward by a fixing discharge roller 66 (as shown by the arrow 22 in FIG. 2).

Now, a support structure for the fixing roller 62 according to the present embodiment will be described with reference to FIG. 3. FIG. 3 is a partial enlarged sectional view of the fixing section 60 according to the present embodiment. FIG. 4 is a partial enlarged sectional view of the portion of the fixing section 60 shown in FIG. 3. It should be noted that although FIGS. 3 and 4 illustrate only one axial end of the fixing section 60, the other axial end of the fixing section 60 includes the same support structure.

The fixing section 60 includes, in addition to the above-described fixing roller 62 and the pressing roller 63, a housing 60H, a pushing plate 60R, first support portions 60S1, fastening portions 60S2, screws SC, second support portions 60S3, springs 63S, and fixing bearings 70 (bearing). The housing 60H defines an enclosure of the fixing section 60. The housing 60H rotatably supports the fixing roller 62. The pushing plate 60R is in the form of a frame and movable with respect to the housing 60H. The pushing plate 60R rotatably supports the pressing roller 63.

The fixing roller 62 is rotatable and in the form of a cylinder extending in a widthwise direction of a sheet (in the forward-backward direction), the sheet being subjected to fixing treatment. The fixing roller 62 includes a first rotation shaft 621 (shaft) and a first roller portion 622 (rotary member). The first roller portion 622 is in the form of a cylinder and includes a roller outer circumferential part 622B (outer circumferential portion) and a roller inner circumferential part 622A (inner circumferential portion). The first rotation shaft 621 has an axis of rotation of the fixing roller 62. The first rotation shaft 621 has an axis of rotation of the fixing roller 62. In the present embodiment, the first rotation shaft 621 is non-rotatably secured to the housing 60H and is thus stationary. The fixing roller 62 rotates around the stationary first rotation shaft 621 via the fixing bearings 70 described later.

The roller outer circumferential part 622B constitutes an outer circumferential part of the first roller portion 622, and is made of an elastic material such as a silicon rubber. The roller inner circumferential part 622A constitutes an inner circumferential part of the first roller portion 622, and is configured by a metallic cylindrical tube, the roller inner circumferential part 622A supporting the roller outer circumferential part 622B. The roller inner circumferential part 622A includes axial opposite ends each having a large diameter portion 622C (first inner circumferential portion). The large diameter portion 622C is defined by a part of the roller inner circumferential part 622A that has a larger inside diameter. A pair of the fixing bearing 70 and a pushing ring 80 described later are fitted on the large diameter portion 622C. A small diameter portion 622E (second inner circumferential portion) is disposed adjacently to and at the axially inner sides of the large diameter portions 622C. The small diameter portion 622E has a smaller diameter than the large diameter portions 622C. A roller rising section 622D (rising section) is disposed between each of the large diameter portions 622C and the small diameter portion 622E.

The first support portions 60S1 are each in the form of a cylinder and serve as a shaft support. The first support portions 60S1 axially support the opposite ends of the first rotation shaft 621 and are secured to the housing 60H. The fastening portions 60S2 are in the form of a cylinder and respectively fitted in the spaces between the opposite ends of the first rotation shaft 621 and the first support portions 60S1, and fix the axial position of the first rotation shaft 621. Each of the screws SC fastens one of the fastening portions 60S2 to the first rotation shaft 621. As a result, the axial and radial position of the first rotation shaft 621 is fixed.

The pressing roller 63 includes a second rotation shaft 631 and a second roller portion 632, similarly to the fixing roller 62. The second rotation shaft 631 has an axis of rotation of the pressing roller 63. Similarly to the first rotation shaft 621, the second rotation shaft 631 is non-rotatably secured to the pushing plate 60R and is thus stationary. The pressing roller 63 rotates around the stationary second rotation shaft 631 via two pairs of pressing bearings 633. FIG. 3 shows the pair of pressing bearings 633 disposed at the rear side. The second support portions 60S3 axially support the opposite ends of the second rotation shaft 631 and are secured to the pushing plate 60R. The springs 63S bias the pushing plate 60R supporting the second rotation shaft 631 to the housing 60H. The pressing roller 63 is pushed against the fixing roller 62 by the biasing force of the springs 63S (as shown by the arrow D31 in FIG. 3) to define a nip therebetween.

The fixing bearings 70 are attached to the opposite ends of the first rotation shaft 621 to rotatably support the fixing roller 62, the fixing bearing 70 being in the form of a ball bearing. With reference to FIG. 4, the fixing bearing 70 includes an inner race 701, an outer race 702, and balls 703 (balls). The inner race 701 is in the form of a ring and defines the inner circumference of the fixing bearing 70. The inner race 701 is fitted on the first rotation shaft 621 to support the first rotation shaft 621. The inner race 701 is tightly secured to the first rotation shaft 621, and therefore not rotatable.

The outer race 702 is in the form of a ring and defines the outer circumference of the fixing bearing 70, the outer race 702 being radially spaced from the inner race 701. The outer race 702 is tightly secured to the large diameter portion 622C of the roller inner circumferential part 622A to support the first roller portion 622. The plurality of balls 703 are disposed radially between the inner race 701 and the outer race 702 and in a circumferential direction. The balls 703 roll on the opposite grooves (see grooves R shown in FIG. 9) respectively formed in the inner race 701 and the outer race 702 to thereby allow the outer race 702 to rotate relatively to the inner race 701. Therefore, the outer race 702 rotates integrally with the first roller portion 622 around the first rotation shaft 621.

Figure 7:
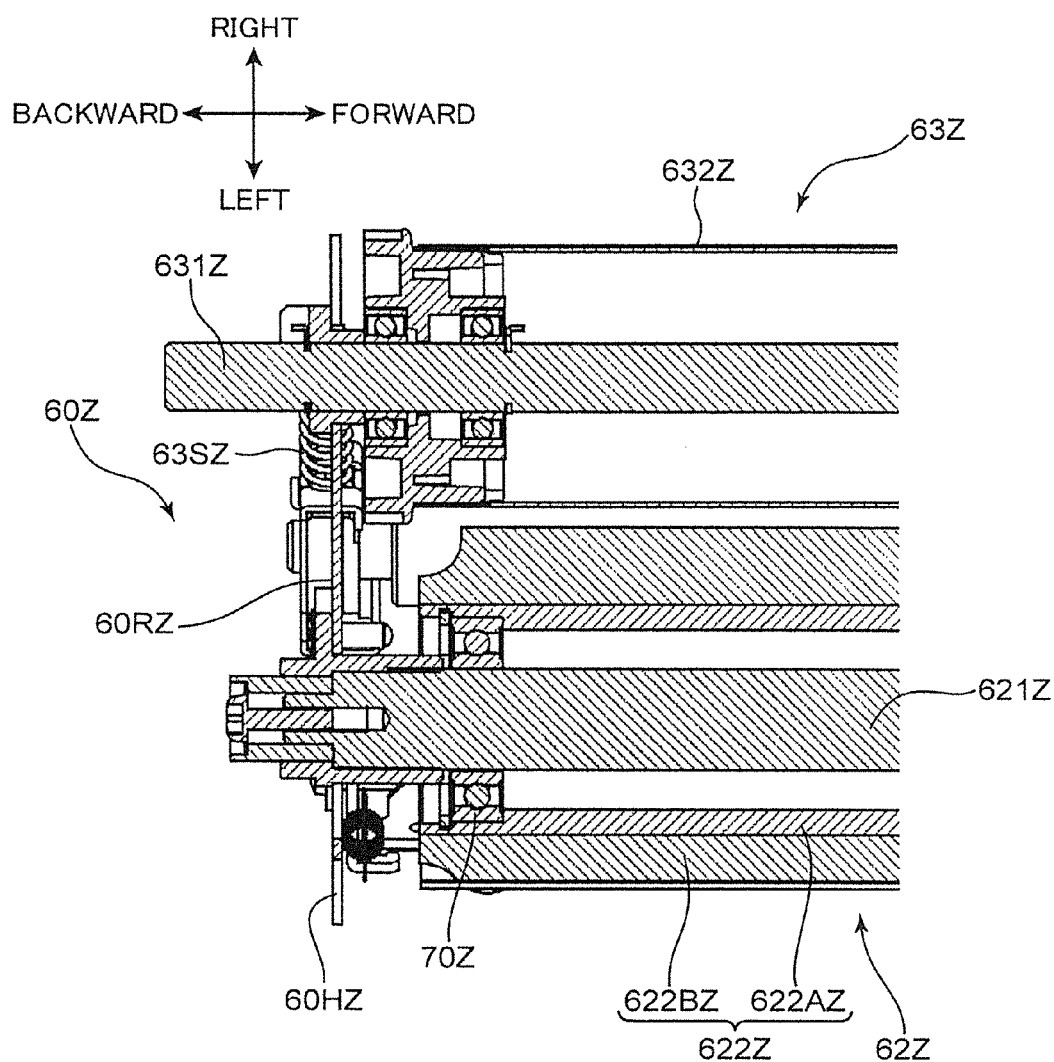
FIG. 7 is a partial sectional view of a fixing device for comparison with the fixing device of the embodiment of the present invention.
Figure 8:
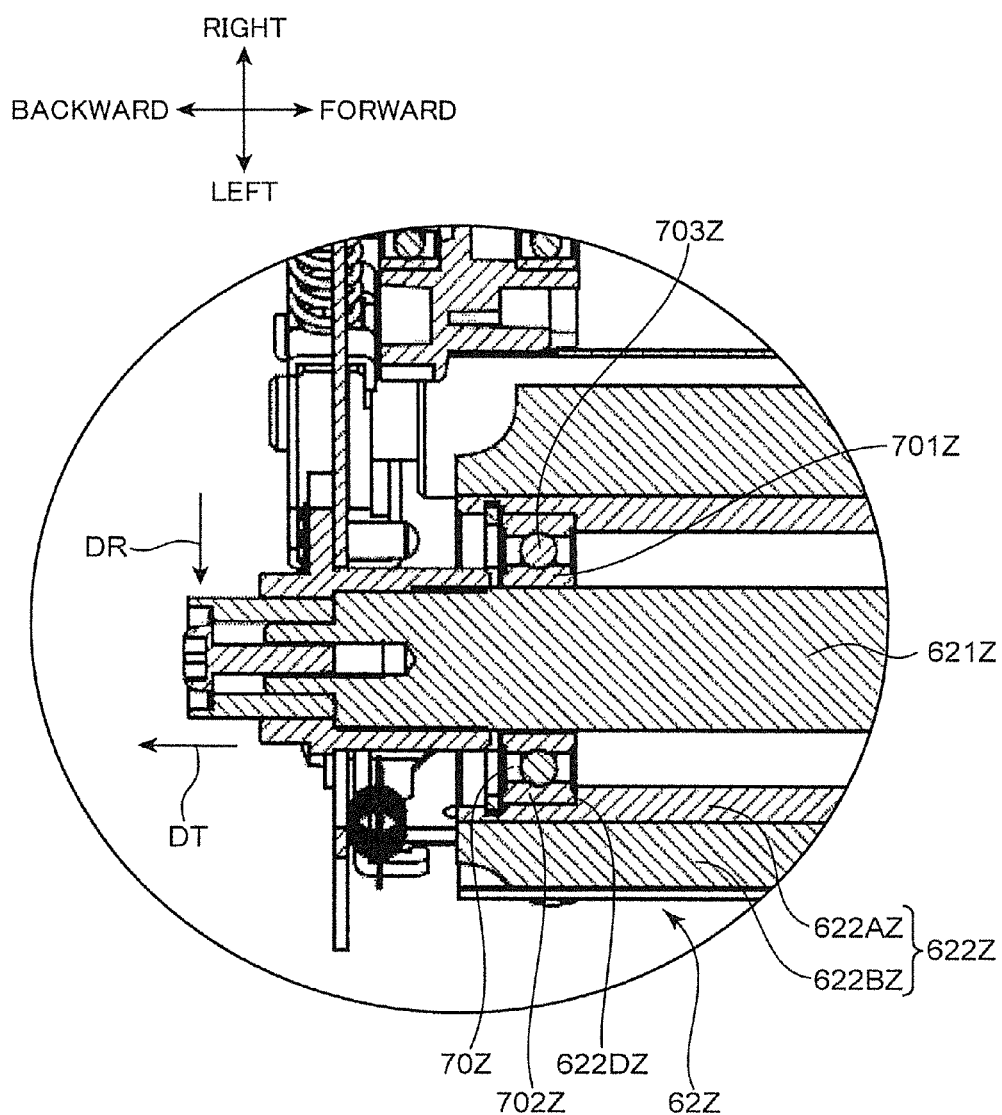
FIG. 8 is a partial enlarged sectional view of the portion of the fixing device shown in FIG. 7.
Figure 9:
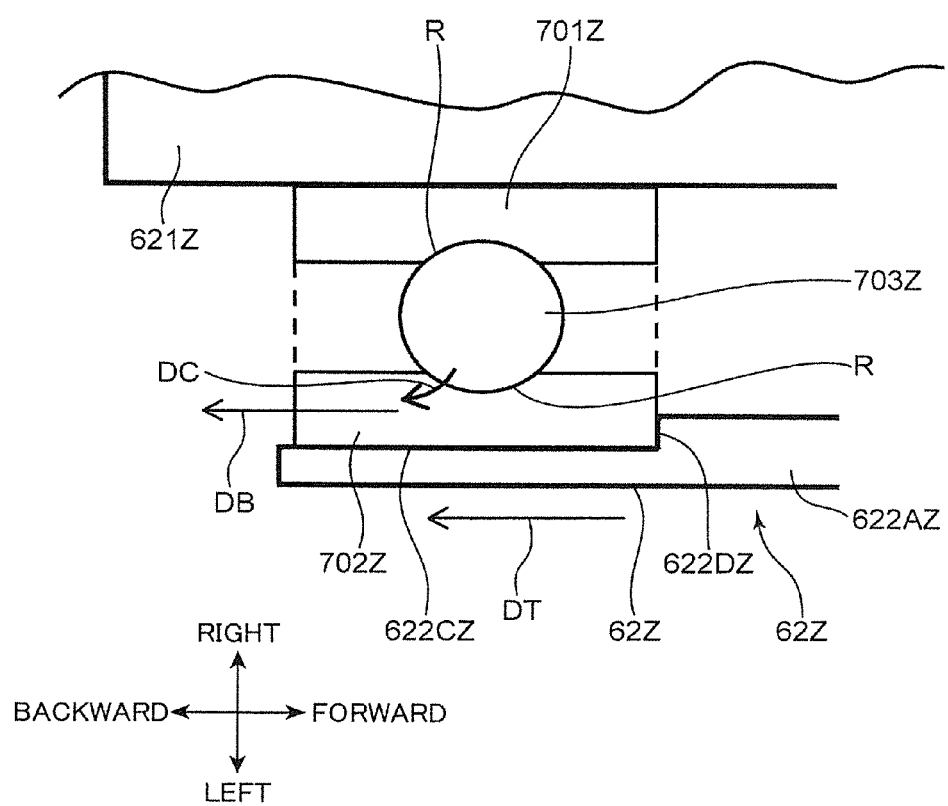
FIG. 9 is a schematic view for explaining a load acting on a bearing in the fixing device shown in FIG. 7.

Now, problems of a fixing section 60Z for comparison with the fixing section 60 of the present embodiment will be described. FIG. 7 is a partial sectional view of the fixing section 60Z. FIG. 8 is a partial enlarged sectional view of the portion of the fixing section 60Z shown in FIG. 7. FIG. 9 is a schematic view for explaining a load acting on a fixing bearing 70Z in the fixing section 60Z shown in FIGS. 7 and 8. In FIGS. 7 to 9, elements that have structures and functions identical to those of the corresponding elements of the fixing section 60 of the present embodiment are denoted by the same reference numerals as in the present embodiment, with "Z" added at the end. The fixing section 60Z differs from the fixing section 60 of the present embodiment in that the fixing section 60Z does not include the pushing rings 80 described later.

A first roller portion 622Z of a fixing roller 62Z is rotatable around a first rotation shaft 621Z configured as a stationary shaft. An unillustrated fixing belt extends on the circumferential surface of the first roller portion 622Z. When the fixing belt is heated by an unillustrated induction heating unit in order to perform a fixing treatment in the fixing section 60Z, the temperature of the first roller portion 622Z increases. When the temperature of the fixing belt reaches a predetermined value, an unillustrated moving mechanism drives a pushing plate 60RZ, so that a pressing roller 63Z is pushed against the fixing roller 62Z by the spring force of a spring 63SZ (as shown by the arrow DR in FIG. 8). The pressing roller 63Z is rotated by an unillustrated driving mechanism to thereby drive the fixing roller 62Z to rotate with the pressing roller 63Z. The first rotation shaft 621Z of the fixing section 60Z is fixedly supported on a housing 60HZ (FIG. 7), similarly to the first rotation shaft 621 of the present embodiment. Therefore, the first rotation shaft 621Z hardly moves even when being pushed by the pressing roller 63Z.

The increase in temperature of the first roller portion 622Z is likely to cause thermal expansion of a roller inner circumferential part 622AZ made of a metal. In the thermal expansion, the roller inner circumferential part 622AZ slightly expands axially outward (as shown by the arrow DT in FIGS. 8 and 9). At this time, a roller rising section 622DZ pushes an outer race 702Z of the fixing bearing 70Z axially outward (as shown by the arrow DB in FIG. 9). On the other hand, an inner race 701Z of the fixing bearing 70Z is tightly secured to the first rotation shaft 621Z. Therefore, the first rotation shaft 621Z does not impart an axial shifting force to the inner race 701Z. Thus, while the first roller portion 622Z of the fixing roller 62Z rotates around the first rotation shaft 621Z, the outer race 702Z is likely to be imparted with an axially outward shifting force. When the thermal expansion of the roller inner circumferential part 622AZ increases, the outer race 702Z is liable to shift over a distance greater than a permissible shift of the outer race 702Z with respect to the inner race 701Z in a thrust direction (in the axial direction). This will cause balls 703Z to fall out of the grooves R respectively formed in the inner race 701Z and the outer race 702Z (as shown by the arrow DC in FIG. 9), which will result in breaking of the fixing bearing 70Z.

Figure 5A:
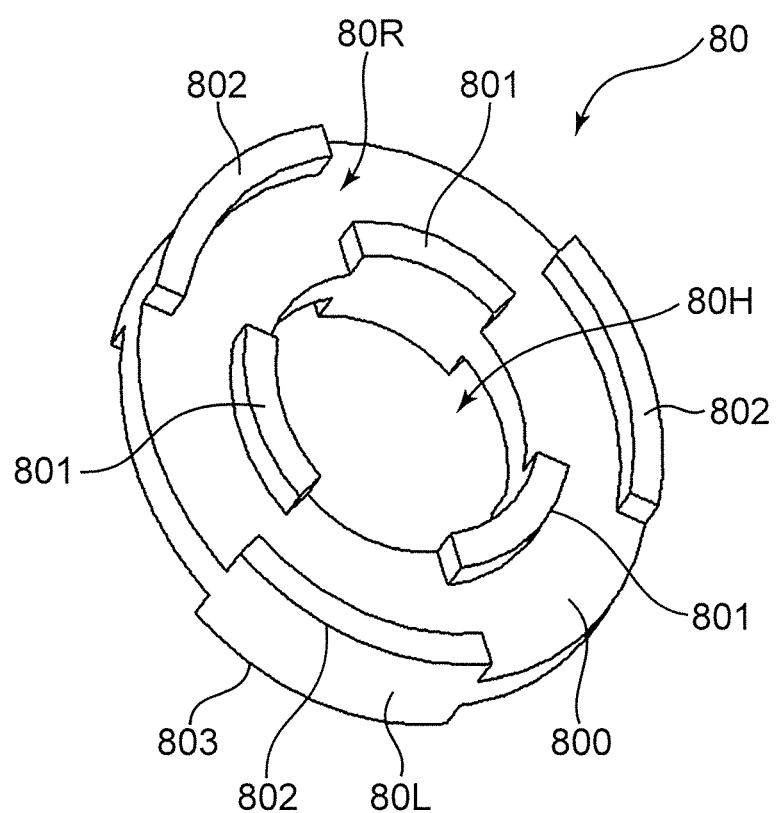
FIG. 5A is a perspective view of a ring member according to the embodiment of the present invention.
Figure 5B:
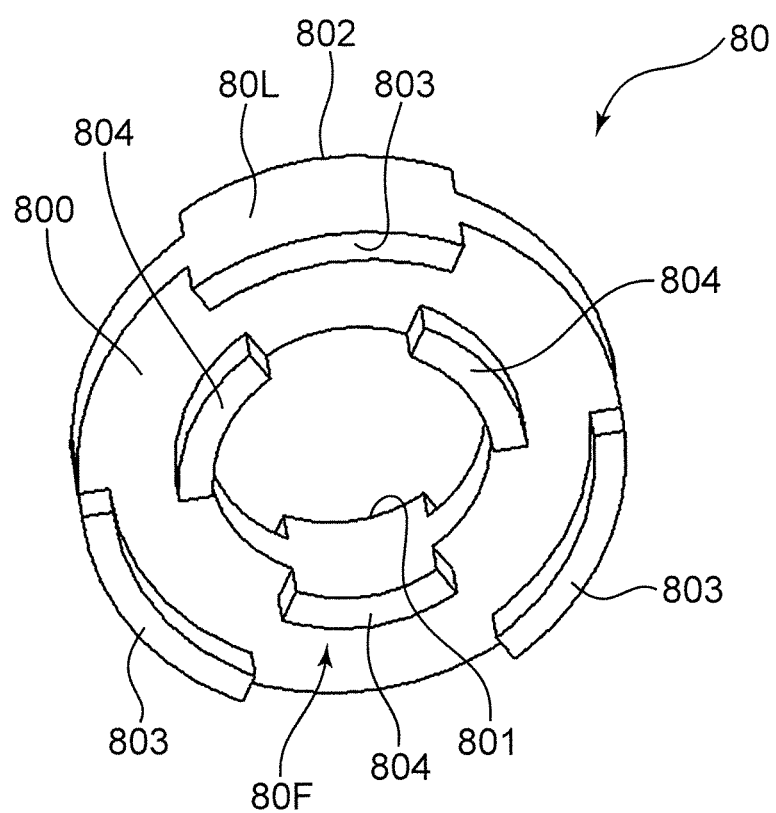
FIG. 5B is a perspective view of the ring member according to the embodiment of the present invention.

In order to solve the above-described problem, in the present embodiment, the fixing section 60 includes the pushing rings 80 (ring member). FIGS. 5A and 5B are perspective views of the pushing ring 80 according to the present embodiment. The pushing ring 80 is made of a metal. With reference to FIGS. 3 and 4, the pushing ring 80 is disposed axially between the fixing bearing 70 and the roller rising section 622D and attached to the large diameter portion 622C. In other words, the pushing ring 80 is fitted on the first rotation shaft 621 adjacently to the axially inner side of the fixing bearing 70. The pushing ring 80 includes an outer circumferential surface 80L, a first side surface 80R (side surface), and a second side surface 80F. Further, the pushing ring 80 includes a base plate 800, a hole 80H, first projections 801, second projections 802, third projections 803, and fourth projections 804. The base plate 800 constitutes the body of the pushing ring 80 and is in the form of a disc. The hole 80H is formed in a central portion of the base plate 800 in a circular shape. The hole 80H allows the first rotation shaft 621 to pass therethrough.

The outer circumferential surface 80L of the pushing ring 80 has a predetermined axial dimension. The outer circumferential surface 80L comes into contact with the large diameter portion 622C from radially inside. The first side surface 80R is defined by one of the opposite side surfaces of the base plate 800. FIG. 5A shows the pushing ring 80 as seen from the side of the first side surface 80R. The second side surface 80F is defined by the other of the opposite side surfaces of the base plate 800. FIG. 5B shows the pushing ring 80 as seen from the side of the second side surface 80F. When the pushing ring 80 is attached to the outer diameter portion 622C as shown in FIG. 4, the pushing ring 80 comes into contact with the inner race 701 and the outer race 702 of the fixing bearing 70 in the axial direction on the side of the first side surface 80R. Further, the pushing ring 80 comes into contact with the roller rising section 622D on the side of the second side surface 80F.

The first projections 801 axially project from a radially inner part of the first side surface 80R and come into contact with the inner race 701 of the fixing bearing 70. The first projections 801 are disposed respectively at three positions spaced apart in a circumferential direction and around the hole 80H. The first projections 801 each have an arc shape. The second projections 802 axially project from a radially outer part of the first side surface 80R and come into contact with the outer race 702 of the fixing bearing 70. The second projections 802 are disposed on an outer peripheral part of the base plate 800 respectively at three positions spaced apart in the circumferential direction. The second projections 802 also each have an arc shape. Further, the first projections 801 and the second projections 802 are alternately disposed in the circumferential direction.

The third projections 803 axially project from a radially outer part of the second side surface 80F and come into contact with the roller rising section 622D. The third projections 803 each have the same shape as the second projections 802. The fourth projections 804 axially project from a radially inner part of the second side surface 80F. The fourth projection 804 each have the same shape as the first projections 801. Further, as shown in FIGS. 5A and 5B, in the present embodiment, the first projections 801 and the second projections 802 are plane-symmetric to the fourth projections 804 and the third projections 803, respectively, with respect to the base plate 800. This makes it possible to provide the same advantageous effect as described later, regardless of whether the pushing ring 80 comes into contact with the fixing bearing 70 on the side of the first surface 80R or on the side of the second surface 80F in its attachment. This allows the mounting of the pushing ring 80 in the fixing section 60 to be performed efficiently.

With reference to FIG. 4, when the fixing belt 64 is heated by the induction heating unit 65 (FIG. 2), the temperature of the fixing roller 62 increases due to the heat transmitted from the fixing belt 64. In particular, because the roller inner circumferential part 622A is made of a metal, the first roller portion 622 thermally expands axially outward (as shown by the arrow DT in FIG. 4) in the same manner as the roller inner circumferential part 622AZ of the fixing section 60Z shown in FIG. 8. At this time, in the present embodiment, the outer circumferential surface 80L (FIG. 5A) of the pushing ring 80 is in close contact with the large diameter portion 622C and the third projections 803 of the pushing ring 80 are in contact with the roller rising section 622D. Therefore, the pushing ring 80 is pushed axially outward by the roller inner circumferential part 622A. Consequently, the second projections 802 of the pushing ring 80 push the outer race 702 of the fixing bearing 70 axially outward, and the first projections 801 of the pushing ring 80 pushes the inner race 701 of the fixing bearing 70 axially outward. It should be noted that, although the sectional view of FIG. 4 shows only a part of the first projections 801 and the second projections 802, the first projections 801 and the second projections 802 push the inner race 701 and the outer race 702, respectively, each at three positions in the circumferential direction, as described above.

As a result, not only the outer race 702 being in close contact with the large diameter portion 622C, but also the inner race 701 being in close contact with the circumferential surface of the first rotation shaft 621 are pushed axially outward by the pushing ring 80. This allows the inner race 701 to shift axially with the outer race 702. This prevents the inner race 701 and the outer race 702 from shifting with respect to each other in the axial direction beyond a permissible range. Consequently, it is possible to prevent the balls 703 from falling out of the grooves R (FIG. 9) and thereby prevent the fixing bearing 70 from being broken. As described, the pushing ring 80 according to the present embodiment functions to impart an axial shifting force to the inner race 701 of the fixing bearing 70 owing to thermal expansion of the roller inner circumferential part 622A of the first roller portion 622, the thermal expansion being caused by heat generated by the induction heating unit 65.

Further, the first projections 801 and the second projections 802 reliably push the inner race 701 and the outer race 702, respectively, each at three positions spaced apart in the circumferential direction. This can prevent the fixing bearing 70 from tilting with respect to the first rotation shaft 621 and thereby being broken. It should be noted that the first projections 801 and the second projections 802 may alternatively be disposed at four positions spaced apart in the circumferential direction.

Further, in the present embodiment, the third projections 803 on the second side surface 80F are in contact with the roller rising section 622D. This allows the roller inner circumferential part 622A to reliably push the pushing ring 80 in the axial direction, so that the pushing ring 80 can push the inner race 701 and the outer race 702 of the fixing bearing 70 with a relatively strong force.

Further, because the first projections 801 and the second projections 802 are plane-symmetric to the fourth projections 804 and the third projections 803, respectively, with respect to the base plate 800, the pushing ring 80 can push the inner race 701 and the outer race 702 both in the case where the first side surface 80R faces the fixing bearing 70 and in the case where the second side surface 80F faces the fixing bearing 70, as described above.

Further, in the present embodiment, the difference between a first projection amount of the first projections 801 axially projecting from the first side surface 80R and a second projection amount of the second projections 802 axially projecting from the first side surface 80R is smaller than an axial shift of the inner race 701 and the outer race 702 of the fixing bearing 70 with respect to each other. Similarly, the difference between a third projection amount of the third projections 803 axially projecting from the second side surface 80F and a fourth projection amount of the fourth projections 804 axially projecting from the second side surface 80F is smaller than the axial shift of the inner race 701 and the outer race 702 of the fixing bearing 70 with respect to each other. The "shift" inevitably occurs in the fixing bearing 70, and is an accepted slight movement of one of the inner race 701 and the outer race 702 in an axial direction in the state that the other is secured. By setting the respective projection amounts of the first projections 801, the second projections 802, the third projections 803, and the fourth projections 804, it is possible to prevent the inner race 701 and the outer race 702 from undesirably shifting with respect to each other in the axial direction beyond the permissible range when these projections come into contact with the fixing bearing 70.

Further, in the present embodiment, the pushing ring 80 is made of a metal, similarly to the roller inner circumferential part 622A of the first roller portion 622. This also allows the pushing ring 80 to thermally expand to thereby push the inner race 701 and the outer race 702 actively.

The fixing section 60 according to the embodiment of the present invention and the image forming apparatus 1 including the same have been described. In the above-described embodiment, the fixing roller 62 is reliably rotatably supported. This allows the fixing roller 62 (fixing belt 64) and the pressing roller 63 to reliably define the fixing nip therebetween. The present invention is not limited to the above-described embodiment and, for example, the following modified embodiments may be adopted.

Figure 6A:
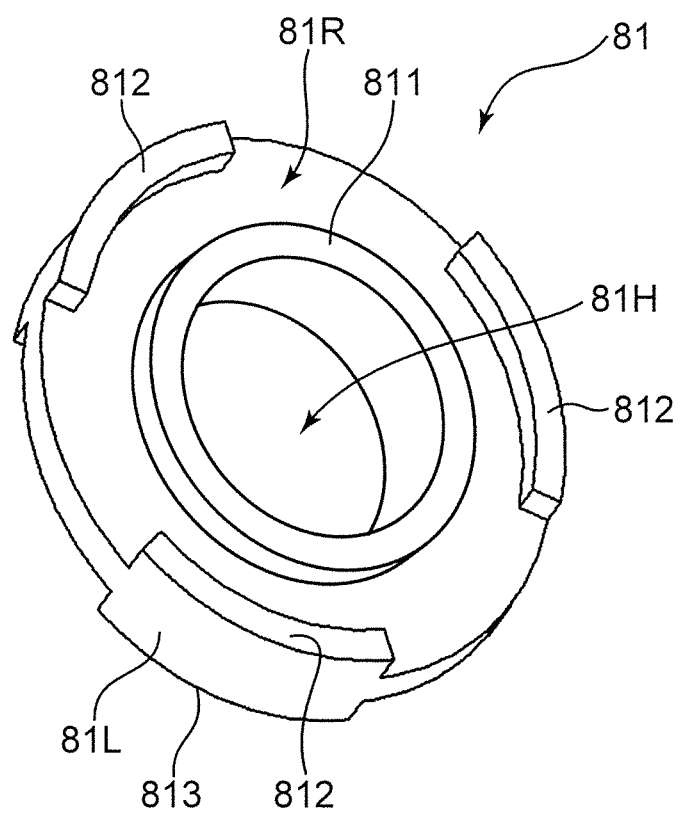
FIG. 6A is a perspective view of a ring member according to a modified embodiment of the present invention.
Figure 6B:
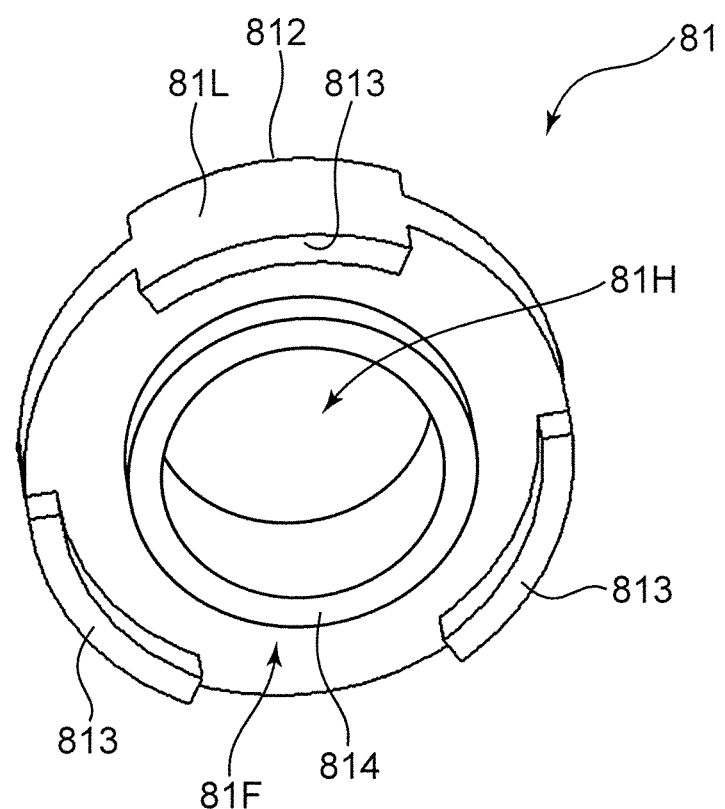
FIG. 6B is a perspective view of the ring member according to the modified embodiment of the present invention.

(1) In the above-described embodiment, the projections of the pushing ring 80 in each set are respectively disposed at three positions in the circumferential direction, as shown in FIG. 5A. However, the present invention is not limited to this configuration. FIGS. 6A and 6B are perspective views of a pushing ring 81 (ring member) according to a modified embodiment of the present invention. The pushing ring 81 includes a first projection 811 and second projections 812 on a first side surface 81R (side surface), and third projections 813 and a fourth projection 814 on a second side surface 81F, similarly to the pushing ring 80 of the above-described embodiment. A hole 81H allows the first rotation shaft 621 (FIG. 3) to pass therethrough. An outer circumferential surface 81L is in contact with the large diameter portion 622C. The first projection 811 and the fourth projection 814 are each in the form of a ring.

In the present modified embodiment, the first projection 811 of the pushing ring 81 is in contact with the inner race 701 of the fixing bearing 70 over an entire circumference thereof. Even in this case, the pushing ring 81 can reliably push the inner race 701 of the bearing 70. Further, in another modified embodiment, the second projections 812 and the third projections 813 shown in FIGS. 6A and 6B may alternatively be also configured as a single ring, similarly to the first projection 811 and the fourth projection 814. Alternatively, the pushing ring 81 may be configured to have a second projection 812 and a third projection 813 in the form of a ring in the circumferential direction, and first projections 811 and fourth projections 814 having similar shapes to those of the first projections 801 shown in FIG. 5A and the fourth projections 804 shown in FIG. 5B. Further, the pushing ring 80 of the above-described embodiment may alternatively be configured so that only the first side surface 80R has first projections 801 and second projections 802 and the second side surface 80F has no projections.

(2) In the above-described embodiment, the fixing section 60 includes the fixing belt 64. However, the fixing section 60 may be modified so that a nip is defined directly by the fixing roller 62 and the pressing roller 63 without the fixing belt 64. Further, a known halogen lamp may be disposed in one of the rollers as a heat source for generating heat to be transmitted to the fixing roller 62, in place of the induction heating unit 65.

The invention claimed is:
1. A fixing device, comprising:
 a housing;
 a rotary member in the form of a cylinder including an outer circumferential portion, and an inner circumferential portion made of a metal;

a shaft secured to the housing and having an axis of rotation of the rotary member;

a heat source configured to generate heat to be transmitted to the rotary member;

a bearing including an inner race supporting the shaft, and an outer race radially spaced from the inner race and supporting the inner circumferential portion of the rotary member, the outer race being rotatable relatively to the inner race; and a ring member fitted on the shaft adjacently to the bearing, and including a circumferential surface in contact with the inner circumferential portion of the rotary member from radially inside, and a side surface in contact with the inner race and the outer race of the bearing in an axial direction, wherein the ring member is in contact with the inner race and the outer race of the bearing at least at three positions spaced apart in a circumferential direction.

2. A fixing device according to claim 1, wherein the ring member is made of a metal.

3. A fixing device according to claim 1, wherein the bearing is configured by a ball bearing including a plurality of balls circumferentially disposed between the inner circumferential portion and the outer circumferential portion.

4. A fixing device according to claim 1, wherein the rotary member is to be disposed so as to face a developer image carried on a sheet and serve as a fixing roller, the fixing device further comprising a pressing roller operable to be pressed against the fixing roller to define a nip with the fixing roller for allowing the sheet to pass therethrough.

5. A fixing device according to claim 4, further comprising a fixing belt extending on a circumferential surface of the fixing roller and coming into contact with the sheet.

6. A fixing device according to claim 1, wherein the ring member imparts an axial shifting force to the inner race of the bearing owing to thermal expansion of the inner circumferential portion of the rotary member, the thermal expansion being caused by heat generated by the heat source.

7. An image forming apparatus, comprising:

an image forming section configured to form a developer image on a sheet; and a fixing device according to claim 1 configured to fix the developer image on the sheet.

8. A fixing device according to claim 1, wherein the ring member is in contact with the inner race or the outer race of the bearing over an entire circumference thereof.

9. A fixing device, comprising:

a housing;

a rotary member in the form of a cylinder including an outer circumferential portion, and an inner circumferential portion made of a metal;

a shaft secured to the housing and having an axis of rotation of the rotary member;

a heat source configured to generate heat to be transmitted to the rotary member;

a bearing including an inner race supporting the shaft, and an outer race radially spaced from the inner race and supporting the inner circumferential portion of the rotary member, the outer race being rotatable relatively to the inner race; and a ring member fitted on the shaft adjacent to the bearing, and including a circumferential surface in contact with the inner circumferential portion of the rotary member from radially inside, and a side surface in contact with the inner race and the outer race of the bearing in an axial direction, wherein the ring member includes a base plate in the form of a disc, the base plate having a hole allowing the shaft to pass therethrough, a first side surface, and a second side surface opposite to the first side surface, a first projection axially projecting from a radially inner part of the first side surface of the base plate and being in contact with the inner race of the bearing, and a second projection axially projecting from a radially outer part of the first side surface of the base plate and being in contact with the outer race of the bearing.

10. A fixing device according to claim 9, wherein the ring member is in contact with the inner race and the outer race of the bearing at least at three positions spaced apart in a circumferential direction.

11. A fixing device according to claim 10, wherein the ring member is in contact with the inner race or the outer race of the bearing over an entire circumference thereof.

12. A fixing device according to claim 9, wherein the difference between a first projection amount of the first projection axially projecting from the first side surface of the base plate and a second projection amount of the second projection axially projecting from the first side surface of the base plate is smaller than an axial shift of the inner race and the outer race of the bearing with respect to each other.

13. A fixing device according to claim 9, wherein the inner circumferential portion of the rotary member includes a first inner circumferential portion in contact with the outer race of the bearing and the circumferential surface of the ring member, a second inner circumferential portion disposed adjacently to the first inner circumferential portion and having a smaller inside diameter than the first inner circumferential portion, and a rising section disposed between the first inner circumferential portion and the second circumferential portion and in contact with the second side surface of the ring member.

14. A fixing device according to claim 13, wherein the ring member includes a third projection axially projecting from a radially outer part of the second side surface and in contact with the rising section.

15. A fixing device according to claim 14, wherein the ring member includes a fourth projection axially projecting from a radially inner part of the second side surface, and the first and the second projections are plane-symmetric to the fourth and the third projections, respectively, with respect to the base plate.

16. A fixing device according to claim 15, wherein the difference between a third projection amount of the third projection axially projecting from the second side surface of the base plate and a fourth projection amount of the fourth projection axially projecting from the second side surface of the base plate is smaller than an axial shift of the inner race and the outer race of the bearing with respect to each other.

17. A fixing device according to claim 9, wherein
the bearing is configured by a ball bearing including a plurality of balls circumferentially disposed between the inner circumferential portion and the outer circumferential portion.

18. A fixing device according to claim 9, wherein
the rotary member is to be disposed so as to face a developer image carried on a sheet and serve as a fixing roller, the fixing device further comprising a pressing roller operable to be pressed against the fixing roller to define a nip with the fixing roller for allowing the sheet to pass therethrough.

19. A fixing device according to claim 18, further comprising
a fixing belt extending on a circumferential surface of the fixing roller and coming into contact with the sheet.

20. An image forming apparatus, comprising:
an image forming section configured to form a developer image on a sheet; and
a fixing device according to claim 9 configured to fix the developer image on the sheet.

\* \* \* \* \*